United States Patent Office 3,297,612
Patented Jan. 10, 1967

3,297,612
METHOD FOR STABILIZING LATEXES OF ACRYLIC POLYMERS
Walter J. Lee and Milton S. Wing, Lake Jackson, and Horace S. Henderson, Freeport, Tex., assignors to The Dow Chemical Company, Midland, Mich., a corporation of Delaware
No Drawing. Filed Aug. 17, 1961, Ser. No. 132,022
3 Claims. (Cl. 260—29.6)

This invention relates to an improved method for stabilizing certain polymer latexes. More particularly, it relates to such a method which does not depend upon the addition of foreign non-polymeric ingredients into the latex.

In the well-known art of emulsion polymerization a monomeric liquid composition comprising a polymerizable ethylenically unsaturated compound is colloidally emulsified in an aqueous medium that usually contains a wetting agent and a polymerization catalyst. The resulting colloidal emulsion is then subjected to conditions conducive to polymerization of the monomeric constituents to produce an aqueous colloidal dispersion of the corresponding polymeric product. That latter colloidal dispersion is commonly referred to as a latex.

The stability of the polymer latex against premature coagulation or precipitation of its polymeric ingredient depends on many factors, such as the kind and amount of wetting agents and the like that are contained in the aqueous suspending medium, on the polymer solids content of the latex, on the particle size of the latex, and on other factors. In many instances the latexes are so unstable as to prematurely coagulate in but a matter of a few days after polymerization. Such instability precludes the commercial exploitation of such latexes into areas requiring the prolonged storage of a bulk supply of a latex. In some instances the stability of such a latex has been improved by incorporating additional amounts of wetting agents or other similar stabilizers into the latex after completion of the polymerization step. However, latexes stabilized with such external surfactants are stable only to a limited degree and are more or less vulnerable to external destabilization.

In addition, in many instances those post stabilizers have been ultimately objectionable. For example, in coatings derived from aqueous latexes by evaporation of water from a layer of such latex the non-volatile surfactants remain with the polymer deposit. Those water-soluble ingredients in the coating seriously and deleteriously affect the quality of the coating, such as in water sensitivity.

Many applications of polymer latexes require a stable dispersion and a dispersion with as little water-soluble material present as is possible.

With the above viewpoints in mind, it is the principal object of this invention to provide an improved method for stabilizing polymer latexes.

It is a further object to provide such a process which is useful with acrylic polymers.

It is a still further object to provide such a process without having to add additional ingredients to the latex or to modify the pH, particle size, or any other characteristic of the latex.

The above and related objects are achieved by the method of the invention which broadly contemplates passing superheated steam at a temperature of from about 140° to about 180° C. through an aqueous latex of an acrylic polymer until the amount of non-polymerized organic material in the latex has been reduced to less than 0.02 weight percent as measured by gas-liquid chromatography. More specifically, the latex is advantageously an aqueous colloidal dispersion of a water-insoluble addition polymer of an acrylic monomer of the formula

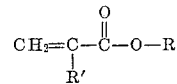

wherein R is selected from the group consisting of hydrogen, alkyl having from 1 to 18 carbon atoms, hydroxyalkyl having from 1 to about 4 carbon atoms and phenyl, and R' is selected from the group consisting of hydrogen, methyl, and ethyl. The latex is maintained at a temperature of about 100° C. during the passage therethrough of the superheated steam. The gas-liquid chromatography test is carried out at a temperature from about 150° to about 200° C., preferably in accordance with the technique described hereinafter. The resulting latex is unexpectedly stable.

As indicated, this method imparts stability to latexes of water-insoluble addition polymers of at least one acrylic monomer falling within the aforementioned general formula. Typical examples of acrylic monomers useful herein are methyl, ethyl, isopropyl, butyl, 2-ethylhexyl, lauryl, octadecyl, 2-hydroxyethyl, and phenyl acrylates and the corresponding methacrylates and ethacrylates, acrylic acid and methacrylic acid. The invention is operable with homopolymers of the above monomers and with interpolymers of two or more such acrylic monomers with each other or together with another monoethylenically unsaturated comonomer, such as styrene, vinyl chloride, vinylidene chloride, vinyl acetate, vinyl propionate, or acrylonitrile.

The latexes for which the present invention provides the desired stability are the aqueous emulsion polymerizates of the above monomeric materials. Although the invention confers the beneficial results on commercial latexes, it has been found to be most useful with freshly prepared latexes, that is, those within about 24 hours of completion of polymerization. The method can be used with latexes prepared by any of the known emulsion polymerization techniques including both batchwise and continuous methods. In a representative emulsion polymerization technique, the premixed monomers are dispersed in an aqueous medium containing a free radical polymerization catalyst, such as hydrogen peroxide or potassium persulfate, and an emulsifier including typically anionic agents, such as the alkyl aryl sulfonates and sodium alkyl sulfates or nonionic agents, such as polyethoxyethanols. The so-formed emulsion, while agitated, is then subjected to elevated temperature usually from about 30° to about 80° C. to induce polymerization. After completion of polymerization, the latex is filtered to remove precoagulum. When made with an anionic emulsifier, the latex pH is frequently adjusted to the alkaline side.

For most end uses it is necessary to have latexes containing from about 20 to about 60 percent of polymer solids by weight based on the whole latex. Those with less than 20 percent are usually uneconomical to prepare and to use. Latexes with greater than about 60 percent polymer solids are generally less stable to forces of mechanical shear and similar environmental factors than their more dilute counterpart. The method of this invention is operable with equal efficacy with latexes of any polymer solids concentration.

In a similar vein the end use of a latex frequently dictates the optimum particle size for that latex. Most latexes have particle sizes ranging from about 200 angstrom units to about 3000 angstrom units or greater. When the particle size becomes appreciably larger, the latexes tend to have slightly less stability than those with smaller particle sizes. The present invention is capable of imparting additional stability to latexes of any particle size, however.

It has been found that certain non-polymerized ingredients influence the stability of the latex. The method of this invention involves the removal of certain of those ingredients from the latex to a critical limit by means of steam stripping. Those non-polymerized ingredients include a multitude of materials. Typically the non-polymerized materials comprise impurities in the monomers used in preparing the latex. In the case of acrylate and methacrylate esters, this impurity commonly is the alcohol used to esterify the corresponding acid. Other monomeric impurities include polymerization inhibitors, such as the methyl ether of hydroquinone. Other non-polymerized ingredients include residual monomer. Many other such ingredients usually will be found in a freshly polymerized latex. It is the salient feature of this invention that the cumulative total of all of these non-polymerized ingredients must be reduced to less than 0.02 percent as measured by gas-liquid chromatography under conditions as will be described.

Gas-liquid chromatography is a well-known analytical and partitioning technique which has been described many times in the literature. Recently, for example, Safranski et al. published the article, "Gas Chromatography the Fine Touch in Separations," in Chemical and Engineering News, vol. 39, No. 26, page 102 (June 16, 1961). For the present invention, the partition column should be packed with 30 percent of polyethyleneglycol of molecular weight of 6000 on 70 percent diatomaceous earth and run at from about 150° C. to about 200° C. The actual temperature employed depends to large degree on the acrylate esters employed in the polymerization, since the alcohol used in making the ester is one of the common impurities and must be vaporized. Thus, a latex of a polymer of butyl acrylate can be run at about 150° C., whereas with 2-ethylhexyl acrylate the run should be made at about 200° C. Simple preliminary experiments will establish an optimum temperature within the stated range.

The present method comprises passing superheated steam at a temperature of about 140° to about 180° C. through the latex until the non-polymerized materials are removed to the indicated level. The use of lower temperature steam causes the latex solids to decrease through an increase in the water content. Higher temperature steam lowers the water content of the latex.

The latex being treated should be maintained at a temperature of about 100° C. during the time of passage of the superheated steam. If that temperature is too low, the water content of the latex will increase and, if too high, water will be lost from the latex.

It has been determined that the limit of non-polymerized materials will be attained when the superheated steam is passed through the latex for a length of time of from about 15 minutes to about 3 hours. The determinant of the length of time is the reduction of the non-polymerized materials to the aforementioned critical limit. With almost all latexes, however, this limit will be reached in the previously mentioned time range.

The use of the present method results in latexes of greatly increased storage stability. That increase is achieved without chemical modification of the polymer or without the incorporation of foreign materials into the latex.

The operability of the method and the beneficial results attained thereby will be illustrated by the following non-limiting example.

*Example*

Into a reaction vessel equipped with a means for stirring, purging, refluxing, and temperature control were placed 100 parts by weight of water, 13.1 parts by weight of sulfated alkyl ester emulsifier, and 0.16 part by weight of potassium persulfate catalyst. A monomer phase was prepared comprising 67 parts by weight of ethyl acrylate, 33 parts by weight of methyl methacrylate, 1 part of acrylic acid, and 2 parts by weight of methacrylic acid.

The aqueous phase was heated to 80° C. and maintained in the range of from about 80° C. to about 85° C. while the monomer phase was added thereto dropwise over a one-hour period. Upon completion of monomer addition, the mixture was digested for one hour at 95° C.

A portion of the latex thus prepared was transferred to a steaming vessel which comprised a flask equipped with removable dip-leg, thermocouple, and vent. This flask, containing the latex, was placed into a larger vessel whereby steam could be used to maintain the ambient temperature of the vessel containing the latex at about 102° C. Superheated steam, i.e., 140° to 180° C., was passed through the latex by means of the dip-leg for a period of 2.5 hours.

At the end of this time, the non-polymerized materials were determined by gas-liquid chromatography according to the following procedure. One milliliter of latex was pipetted into a 4-dram tared vial and weighed. The latex sample was dissolved in 9 milliliters of acetic anhydride. A standard was run on the solvent. 0.1 milliliter of solution was injected into the chromatography apparatus. The percent of non-polymerized materials was read from the curve of the standard. The column used was packed with 30 percent polyethyleneglycol of 6000 molecular weight on 70 percent diatomaceous earth. The temperature employed was 150° C.

A sample portion of the latex product of polymerization was left unsteamed as a control. Each of the samples was subjected to an accelerated storage stability test in an oven. This test comprised adjusting the pH of the sample to 10. The sample was then placed in an oven maintained at 55° C. If the sample did not thicken in 48 hours, it was considered to have good stability and could be expected to exhibit good shelf life. If the formulation gelled within 16 hours, it was a failure. Between 16 hours and 48 hours if the latex began to thicken, it would not be expected to have a particularly long shelf life. When tested according to this procedure, the latex treated in accordance with this invention had good stability, whereas a control containing 0.03 percent non-polymerized materials as measured by the aforementioned gas-liquid chromatography procedure failed. One sample treated in accordance with this invention survived 112 hours and another 184 hours before thickening and survived 384 and 360 hours before gelling. The sample with but 0.03 percent by weight non-polymerized materials thickened in less than 15 hours and gelled in 15 hours. In a similar contrasting vein, a latex containing 0.06 percent by weight non-polymerized materials thickened in less than 16 hours and gelled in 16 hours.

Similar results are observed with latexes of the homopolymers of ethyl acrylate, butyl acrylate, and 2-ethylhexyl acrylate; copolymers of ethyl acrylate and acrylic acid, of butyl acrylate, ethyl acrylate, and methacrylic acid and of butyl acrylate, methyl methacrylate and methacrylic acid.

What is claimed is:

1. A method for stabilizing aqueous latexes of a polymer selected from the group consisting of a homopolymer of an acrylic monomer of the formula

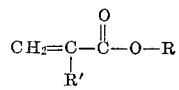

wherein R is selected from the group consisting of hydrogen, alkyl having from 1 to 18 carbon atoms, hydroxyalkyl having from 1 to about 4 carbon atoms and phenyl, and R' is selected from the group consisting of hydrogen, methyl, and ethyl, and copolymers thereof with a monoethylenically unsaturated monomer, said method comprising passing through said latex superheated steam at a temperature of from about 140° to about 180° C. while maintaining said latex at a temperature of about 100° C. until the amount of non-polymerized organic materials in said latex has been reduced to less than 0.02 percent by weight as measured by gas-liquid chromatography at from 150° to 200° C. using polyethyleneglycol of 6000 molecular weight adsorbed on diatomaceous earth as the sorbent.

2. The method claimed in claim 1 wherein said acrylic polymer is an interpolymer of ethyl acrylate, methyl methacrylate, acrylic acid, and methacrylic acid.

3. The method claimed in claim 2 wherein said acrylic polymer is an interpolymer of 67 parts ethyl acrylate, 33 parts methyl methacrylate, 1 part acrylic acid, and 2 parts methacrylic acid.

References Cited by the Examiner

UNITED STATES PATENTS

| | | | |
|---|---|---|---|
| 2,451,332 | 10/1948 | Green | 260—29.7 |
| 2,462,013 | 2/1949 | Waterman | 260—29.7 |
| 2,867,805 | 1/1959 | Ludewig | 260—96 |

MURRAY TILLMAN, *Primary Examiner.*

LEON J. BERCOVITZ, *Examiner.*

D. W. ERICKSON, P. LIEBERMAN,
*Assistant Examiners.*